INVENTOR.
Leonard R. Kahn
BY
Harness, Dickey + Pierce
ATTORNEYS.

Dec. 5, 1961 L. R. KAHN 3,012,209

FREQUENCY MODIFYING APPARATUS

Filed May 15, 1959 2 Sheets-Sheet 2

INVENTOR.

Leonard R. Kahn

BY

Harness, Dickey + Pierce

ATTORNEYS.

United States Patent Office 3,012,209

Patented Dec. 5, 1961

3,012,209
FREQUENCY MODIFYING APPARATUS

Leonard R. Kahn, 81 S. Bergen Place, Freeport, N.Y.

Filed May 15, 1959, Ser. No. 813,427
11 Claims. (Cl. 332—37)

Figure 1:
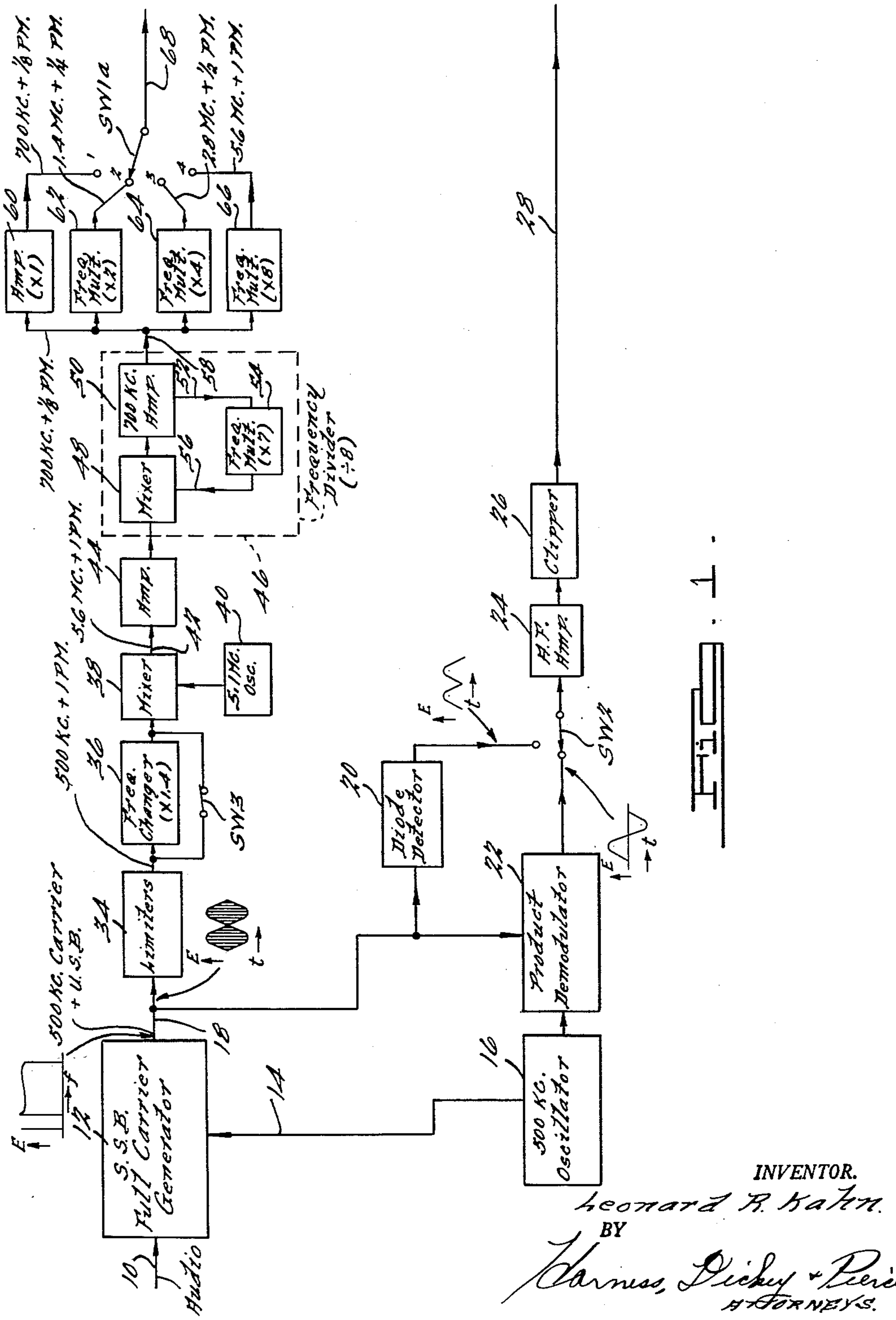

This invention relates to frequency modifying apparatus and more particularly to means for precompensating for those changes in the index of phase modulation of a radio frequency signal which will occur as a result of frequency multiplication in a radio transmitter.

In order to stagger the operating frequencies so as to avoid feedback problems and in order to enable the use of lower frequency crystal oscillators, among other considerations, many radio transmitters are provided with means for producing an output signal of a selected transmitting frequency by multiplying the frequency of an input radio frequency signal by one or more preselected factors. Thus, certain radio transmitters are designed to multiply the frequency of an input radio frequency signal by a selectable one of the factors one, two, four and eight as accomplished, for example, by passing the input radio frequency signal through none, one, two or three of three frequency doublers connected in tandem; and other radio transmitters are designed to multiply the frequency of the input radio frequency signal by a selectable one of the factors one, two, three and six as accomplished, for example, by passing the input radio frequency signal through neither, one or the other, or both in series of a frequency doubler and a frequency trebler. The principles of the present invention are directed to the generation of a radio frequency input signal for transmitters having some such frequency multiplication capability.

While the principles of the present invention are applicable to a variety of types of radio transmission systems, their practice is of particular advantage in single sideband transmission systems in which it is desirable or necessary to preserve the phase modulation characteristics of a radio frequency signal and to precompensate for the variation in the phase modulation characteristics which will occur as a result of frequency multiplication in the transmitter.

In general, precompensation for those changes in the index of phase modulation to which a signal will be subjected as a result of frequency multiplication by a preselected factor greater than one in a transmitter is accomplished by dividing and multiplying the frequency of the input radio frequency signal to the transmitter by factors the quotient of which equals the multiplication factor in the transmitter. Where the transmitter is capable of switching among a plurality of multiplication factors, as in the above examples of one, two, four, and eight, and one, two, three and six, the input signal which is to be applied to the transformer is preliminarily divided by a fixed division factor which is greater than at least some of the multiplication factors in the transmitter and which is preferably equal to the highest multiplication factor in the transmitter as, for example, eight and six for the two above-presented examples. Thereafter, the frequency-divided signal is multiplied by a factor equal to the quotient of the division factor and the instant transmitter multiplication factor. In mathematical terms, this precompensation relationship is expressible as $D$ equals $M$ times $M_t$, where D is the fixed frequency division factor, M is the premultiplication factor, $M_t$ is the transmitter multiplication factor, and where D is at least equal to $M_t$. In the ensuing specific description of a preferred arrangement, it is assumed that the transmitter is capable of multiplying by factors of one, two, four and eight, that the preliminary division is by a factor of eight, and that the intermediate multiplication is by factors of eight, four, two and one, respectively.

A major advantage of this arrangement over that of simply predividing the input radio frequency signal to the transmitter by a factor equal to the instant transmitter multiplication factor is that but a single divider need be provided. This is significant from both initial cost and maintenance standpoints since frequency dividers are normally much more complicated units than frequency multipliers and are more difficult to align and to maintain in proper operation and alignment.

Figure 2:
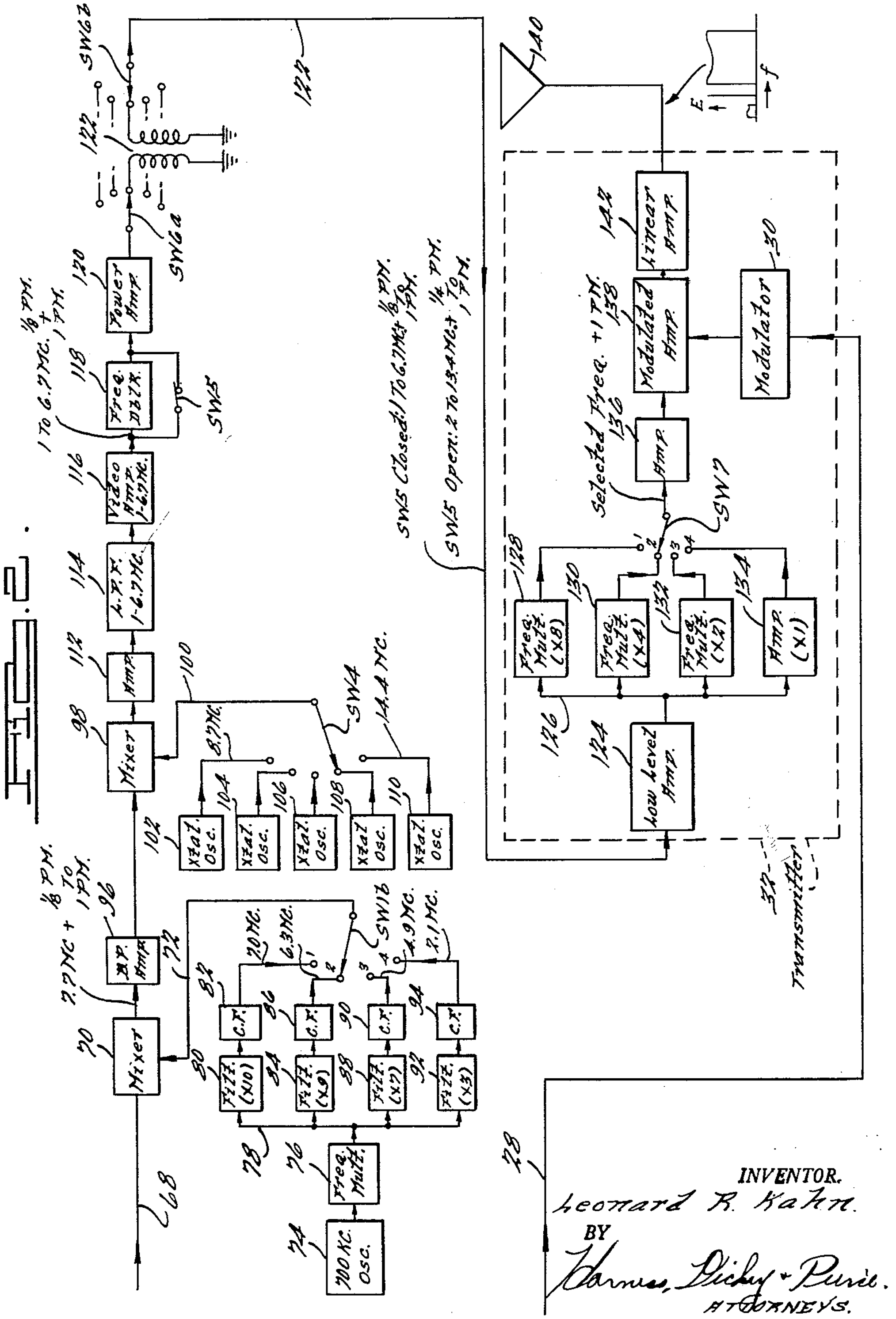

The principles of the invention will be understood from the following detailed description of an embodiment of the invention when read with reference to the accompanying drawings in which:

FIGURE 1 is a schematic representation of a portion of a preferred arrangement embodying the principles of the present invention; and FIG. 2 is a schematic representation of another portion of the equipment of FIG. 1, FIG. 2 being placed to the right of FIG. 1 for proper orientation.

In the preferred embodiment illustrated in the drawings, an audio frequency signal is applied via a conductor 10 to a single sideband full carrier generator 12. A radio frequency signal is also applied to generator 12 over a conductor 14 from an oscillator 16 representatively illustrated as producing a 500 kilocycle per second signal. The output of generator 12, appearing upon conductor 18, is assumed to include the 500 kilocycle per second carrier plus only the upper sideband. The symbols "KC." and "MC." on the drawings are intended to connote kilocycles per second and megacycles per second, respectively.

The signal at conductor 18 includes phase-modulated and amplitude-modulated components. In accordance with the teachings presented in United States Patent 2,666,133, granted January 12, 1954, the phase-modulated component and the amplitude-modulated component may be segregated, separately amplified and recombined to reconstitute an amplified form of the original signal. In accordance with the teachings of my application Serial No. 612,239, filed September 26, 1956, a radio frequency signal may be derived only from the phase-modulated component of the signal on conductor 18, and an audio frequency signal may be derived only from the fundamental of the amplitude-modulated component of the signal on conductor 18, the former may then be modulated by the latter to constitute a signal which, while partaking of the spectrum characteristics of the single sideband signal, will, upon detection in a conventional double sideband receiver, produce an audio signal of minimized distortion, that is, a compatible single sideband signal is transmitted. Both of these arrangements are illustrated in the drawings, with a radio frequency signal derived from the phase-modulated component of the output signal from the single sideband full carrier generator 12 being modulated in transmitter 32 (FIG. 2) by an audio frequency signal derived either from the full amplitude-modulated component of the output of single sideband full carrier generator 12 or from the fundamental of that component.

The disclosures of the above identified patent and the above identified application are incorporated herein by reference.

In both the arrangement disclosed in the above identified patent and the arrangements disclosed in the above identified application, the phase modulation characteristics of the radio frequency signal must be preserved if a proper signal is to be produced upon remodulation of the radio frequency signal with the audio frequency signal in the transmitter. Yet, as above discussed, radio transmitters are frequently provided with means for multiplying the frequency of the input radio frequency signal by a preselected factor which will produce a shift in the phase modulation characteristics of that radio frequency signal. Accordingly, for proper operation of the entire system, there must be precompensation for this effect. It is to this precompensation that the present invention is directed.

The output signal on conductor 18 from the single sideband full carrier generator 12 is applied to a diode detector 20 and a product demodulator 22 which are alternatively placed in operation under the control of switch SW2. Diode detector 20 derives the envelope of the signal on conductor 18, that is, derives the audio frequency component of the upper sideband and carrier signal produced by generator 12. Product demodulator 22 which is supplied with radio frequency energy from oscillator 16 multiplies the upper sideband and carrier signal on conductor 18 times carrier to derive the fundamental of the amplitude-modulation component of the signal on conductor 18.

The audio frequency output from detector 20 or product demodulator 22 is applied through switch SW2 to the audio frequency amplifier 24 the output of which is in turn applied to clipper 26. The output of clipper 26 is applied via conductor 28 (which extends to FIG. 2) to modulator 30 in transmitter 32.

The phase-modulation component of the single sideband and carrier signal on conductor 18 is selected and isolated by limiters 34 (FIG. 1). This signal will be of a certain frequency and will have, at any instant, a certain index of phase modulation. That index of phase modulation may have any value and may vary from time to time, but whatever it is, it must be preserved to the output of transmitter 32 if proper results are to be achieved. To facilitate explanation, the phase modulation condition of the signal at the output of limiters 34 is characterized on the drawings as "1 PM." which is intended to connote merely an initial phase modulation condition and is not intended to denote that the index of phase modulation is "1" or that it is fixed.

In accordance with the teachings of my above identified application, certain improved results can be obtained in the production of a compatible signal by multiplying the frequency of the signal at the output of limiters 34 by a range of factors including the factor 1.4 which is presently believed to be the optimum value. Means 36 for accomplishing this frequency multiplication are illustrated but it will be assumed initially that means 36 is bypassed by switch SW3.

With switch SW3 closed, the output signal from limiters 34 is applied through that switch to mixer 38 which is also supplied with radio frequency energy from a 5.1 megacycle per second oscillator 40. As a result of this heterodyning action, sum and difference frequencies are produced. The sum frequency is selected so that the output of mixer 38, appearing on conductor 42, is a 5.6 megacycle per second radio frequency signal. Alternatively, the 500 kilocycle per second signal can be mixed with a 200 kilocycle per second wave to produce a 700 kilocycle per second signal which is then mixed, in unit 38, with a 4.9 megacycle per second wave from oscillator 40.

The frequency of an audio frequency signal is changed in two ways in the circuits which are diagrammatically illustrated in FIGS. 1 and 2 of the drawings by multiplication (or division) and by heterodyning. Frequency multiplication is the addition of the signal to itself a preselected number of times as opposed to the addition (or subtraction) of the signal and another signal of the same or different frequency, which is heterodyning. In multiplication and division, not only the frequency but also the index of phase modulation is changed by the multiplication or division factor. In heterodyning, the frequency is changed but the index of phase modulation is not.

As a result of the heterodyning action in mixer 38, the frequency of the input signal is changed from 500 kilocycles per second to 5.6 megacycles per second, but the index of phase modulation is not modified. The resultant signal on conductor 42 is amplified by amplifier 44 and applied to a frequency divider 46 which, in view of the assumed transmitter multiplication factors of one, two, four and eight, is designed to divide the frequency of the input signal by eight. The frequency divider is illustratively shown as a regenerative divider, the input signals from amplifier 44 being applied to the mixer 48 the output of which is applied to a tuned amplifier tuned to 700 kilocycles per second. The output of amplifier 50 is applied via conductor 52 to a frequency multiplier 54 which selects the seventh harmonic of the signal on conductor 52. The resultant signal on conductor 56 has a frequency of 4.9 megacycles per second which when mixed in mixer 48 with the input signal produces the 700 kilocycle per second signal which is applied to amplifier 50.

It will be observed that since the input signal to divider 46 is mixed in mixer 48 with a signal derived from that input signal, the mixing action does, in this case, affect the phase modulation characteristics of the input signal so that both the frequency and the index of phase modulation of the output signal from divider 46, appearing on conductor 58, are reduced by a factor of eight relative to those of the input signal applied to divider 46. In the representative example, the signal on conductor 58 has a frequency of 700 kilocycles per second and one-eighth of the index of phase modulation of the original radio frequency signal at the output of the limiters 34.

The signal on conductor 58 is applied to each of a plurality of frequency multipliers 60, 62, 64 and 66 the outputs of which are connected to the terminals of switch SW1*a*. Unit 60 has a multiplication factor of 1 and hence is simply an ampilfier and its output, connected to the one terminal switch SW1*a*, has the same frequency and phase modulation characteristics as the signal on conductor 58. Unit 62 selects the second harmonic of the input signal and its output, as applied to the No. 2 contact of switch SW1*a*, is at a frequency of 1.4 megacycles per second and has a phase modulation characteristic one-fourth of that of the signal at the output of limiters 34, that is, of the original signal. Unit 64 selects the fourth harmonic of the input signal on conductor 58 and hence its output, appearing at the No. 3 contact of switch SW1*a*, is at a frequency of 2.8 megacycles per second and has an index of phase modulation one-half of that of the original signal. Unit 66 selects the eighth harmonic of the signal on conductor 58 and its output, appearing at the No. 4 contact of switch SW1*a*, is at 5.6 megacycles per second and its phase modulation characteristic is identical or substantially identical to that of the signal at the output of the limiters 34.

One of these output signals is selected by switch SW1*a* and applied to conductor 68 (which extends to FIG. 2 of the drawings) and is applied to mixer 70. The frequency of the second input signal applied to mixer 70 via conductor 72 is selected by switch SW1*b*. A 700 kilocycle per second alternating voltage from oscillator 74 is applied to a frequency multiplier or harmonic generator 76 which produces an output signal on conductor 78 which is rich in both even and odd harmonics of the 700 kilocycle per second signal. The tenth harmonic, at 7.0 megacycles per second, is selected by filter 80 and applied through cathode follower 82 to the No. 1 contact of switch SW1*b*; the ninth harmonic, at 6.3 megacycles per second, is selected by filter 84 and applied through cathode follower 86 to the No. 2 contact of switch SW1*b*; the seventh harmonic, at 4.9 megacycles per second, is selected by filter 88 and applied through cathode follower 90 to the No. 3 contact of switch SW1*b*; and the third harmonic, at 2.1 megacycles per second, is selected by filter 92 and applied through cathode follower 94 to the No. 4 contact of switch SW1*b*. Switches SW1*a* and SW1*b* are set in corresponding positions either by being mechanically ganged or under operator control so that the output signal from mixer 70 has a constant frequency of 7.7 megacycles per second independently of the setting of switches SW1*a* and SW1*b*. However, the phase modulation characteristic of that output signal will vary in accordance with the setting of the switches SW1*a* and SW1*b* and will be the same as the phase modulation characteristic of the signal at the output of unit 60, 62, 64 or 66 in accordance with the instant setting of switch SW1*a*, that is, it will have a phase modulation characteristic of one-eighth, one-fourth, one-half or equal to the phase modulation characteristic of the original signal in accordance with whether switch SW1*a* is set in its No. 1, 2, 3 or 4 position, respectively.

The output signal from mixer 70 is applied through a band pass amplifier 96, tuned to 7.7 megacycles per second, and applied to mixer 98. The second input to mixer 98, applied via conductor 100, is any one of a plurality of selected radio frequencies. In the illustrated arrangement, any one of five crystal oscillators 102, 104, 106, 108 and 110 may be connected to conductor 100 under the control of switch SW4, with these crystal oscillators producing radio frequency energy at a frequency in the range of 8.7 to 14.4 megacycles per second. The output of mixer 98 is amplified by amplifier 112 and the difference (rather than the sum) frequencies resulting from the heterodyning action in mixer 98 are selected by low pass filter 114 which passes frequencies between 1.0 and 6.7 megacycles per second but discriminates against the 7.7 megacycle per second signal and signals of all higher frequencies. Consequently the output signal from low pass filter 114 has, in the representative example, a frequency in the range of 1.0 to 6.7 megacycles per second in accordance with the instant setting of switch SW4 and will have an index of phase modulation, in relation to that of the original signal, determined by the instant setting of switch SW1*a*. Switch SW4 is not mechanically ganged with switches SW1*a* and SW1*b* and can be set in any of its positions independently of the instant settings of switches SW1*a* and SW1*b*.

The output of filter 114 is amplified by a wide band amplifier 116 capable of amplifying signals in the range of 1.0 to 6.7 megacycles per second. The output of amplifier 116 may be applied to doubler 118, although that doubler is illustrated as being bypassed by closed switch SW5 in the drawing. With switch SW5 closed, a signal having a frequency in the range of 1.0 to 6.7 megacycles per second is applied to the power amplifier 120. If switch SW5 is opened, frequency doubling occurs and signals at frequencies as high as 13.4 megacycles per second are applied to power amplifier 120.

The output of power amplifier 120 is applied to the movable element of switch SW6*a* which is mechanically ganged with switch SW6*b*. A plurality of pairs of coils (transformers) are connected to corresponding contacts of switches SW6*a* and SW6*b*, one pair of coils 122 being illustrated in the drawings. These coils are wide-band units which are selected in accordance with the desired input frequencies of the transmitter 32. The number of such coils is arbitrary. At any given position of the switches SW6*a* and SW6*b*, the operating frequency of the selected pair of coils, such as coils 122, will bear a relation to the frequency of the selected one of the crystal oscillators 102–110, but it will be appreciated that the frequencies of the control crystals in the oscillators 102–110 may be changed and that switch SW5 may be opened or closed so that there is no imperative relationship between the positions of switches SW6*a*, SW6*b* and SW4.

The signal on conductor 122, which is applied to transmitter 32, will vary in its characteristics in accordance with the settings of the several switches SW1*a*, SW1*b*, SW3, SW4, SW5, SW6*a* and SW6*b*, but assuming switches SW3 and SW5 to be closed, the radio frequency signal on conductor 122 will have a frequency from 1.0 to 6.7 megacycles per second and a phase modulation characteristic of from one-eighth of the index of phase modulation of the original signal to equality with the original signal.

This signal is applied to the low-level amplifier 124 in transmitter 32, the output of which is applied via conductor 126 to each of a plurality of frequency multipliers 128, 130, 132 and 134. Unit 128 selects the eighth harmonic of the signal, that is, it effectively multiples both the frequency and the phase modulation characteristic of the signal by a factor of eight, whereas the multiplication factors in units 130, 132 and 134 is four, two and one, respectively. One of those output signals, as selected by switch SW7, is amplified by amplifier 136 and applied, along with the audio frequency signal from modulator 30, to the modulated amplifier 138. The output of modulated amplifier 138 may be applied directly to a transmission line or to the antenna 140 or, if desired, it may be amplified, as by a linear amplifier 142, as shown.

If switch SW5 remains closed so that there is no frequency doubling of the output signal from unit 116 by frequency doubler 118, switch SW1*a* and SW1*b* should be placed in a position corresponding to that of switch SW7. In this manner, the phase modulation characteristic of the signal will be preserved despite the frequency multiplication which occurs in the transmitter 32. Thus, the output signal from limiters 34, the original signal, was stated to have a phase modulation characteristic of "one." The index of phase modulation of the signal on conductor 58 (at the output of frequency divider 46) will be, at any instant, one-eighth of that of the original signal. In the No. 1 position the switches SW1*a* and SW7, the index of phase modulation of the signal on conductor 68 will be the same as that of the signal on conductor 58 and no change will occur thereafter prior to the frequency multipliers in transmitter 32. Frequency multiplier 128 will multiply the index of phase modulation of the signal by a factor of eight so that the signal applied to amplifier 136 will have an index of phase modulation equal to that of the original signal. With the equipment set in the No. 2 position of switches SW1*a*, SW1*b* and SW7, the index of phase modulation of the original signal is divided by eight in unit 46, is multiplied by two in unit 62, and is multiplied by four in unit 130 to produce a signal at amplifier 136 having phase modulation characteristics identical to that of the original signal. In the No. 3 position of switches SW1*a*, SW1*b* and SW7, the index phase modulation of the original signal is divided by eight in divider 46, is multiplied by four in unit 64, and is multiplied by two in unit 132 to again produce the aforesaid identity; and in the No. 4 positions of switches SW1*a*, SW1*b* and SW7, the index phase modulation of the original signal is multiplied by eight in unit 46, is multiplied by eight in unit 66, and is multiplied by one in unit 134 to again produce the identity between the index of phase modulation of the signal applied to amplifier 136 and the original signal.

If switch SW5 is opened to place the frequency doubler 118 in operation, then switches SW1*a* and SW1*b* should be set to a position which is one step lower than the setting of switch SW7. For example, if switch SW7 is set in its No. 3 position and switch SW5 is open, switches SW1*a* and SW1*b* should be set in their No. 2 positions.

If switch SW3 is opened in compatible single sideband operation of the equipment, the frequency of the signal at the output of limiters 34 and the index of phase modulation of that signal are each multiplied by 1.4. The foregoing description and the succeeding notations on the drawings will be correct under this modified condition if the output of frequency changer 36 is considered to be the "original signal" and to have a phase modulation characteristic of "one."

As previously noted, the disclosed system may be employed in association with a transmitter having means for selectively multiplying the input radio frequency signal by factors of one, two, three and six by appropriate changes in units 46, 64, 66, 88 and 92.

With some loss of the advantages which accrue from the use of an arrangement of the type disclosed in which the division operation (unit 46) precedes the multiplication operation (units 62, 64 and 66), it is possible to reverse the sequence of those operations.

It will be appreciated that the particular arrangement disclosed is but representative of various means for practicing the principles of the invention, that the several rectangles may represent any of a number of different types of equipment for performing the indicated functions, that the frequency division may be accomplished other than through the use of the three blocks which are illustrated, that the illustration of plural separate frequency multipliers connected in parallel is but representative, and that the frequencies, division factors, multiplication factors, and changes in the phase modulation characteristic are illustrative. Further, while it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. In a system for applying a phase modulated input radio frequency signal to a transmitter provided with switchable means for multiplying the frequency of the input radio signal by any one of a plurality of preselected factors, the combination of means for generating a first radio frequency signal, means for dividing the frequency of said first radio frequency signal by a fixed factor greater than one for producing a second radio frequency signal, and switchable means for multiplying the frequency of said second radio frequency signal by a selected one of a plurality of factors equal respectively to the quotient of said fixed factor and a corresponding one of said plurality of preselected factors for producing said input radio frequency signal.

2. In a system for applying a phase modulated input radio frequency signal to a transmitter provided with switchable means for multiplying the frequency of the input radio signal by any one of a plurality of preselected factors, the combination of means for generating a first radio frequency signal, means for dividing the frequency of said first radio frequency signal by a fixed factor larger than at least some of said plurality of factors for producing a second radio frequency signal, and switchable means for multiplying the frequency of said second radio frequency signal by a selected one of a plurality of factors equal respectively to the quotient of said fixed factor and a corresponding one of said plurality of preselected factors for producing said input radio frequency signal.

3. In a system for applying a phase modulated input radio frequency signal to a transmitter provided with switchable means for multiplying the frequency of the input radio signal by any one of a plurality of preselected factors, the combination of means for generating a first radio frequency signal, means for dividing the frequency of said first radio frequency signal by a fixed factor equal to the largest one of said preselected factors for producing a second radio frequency signal, and switchable means for multiplying the frequency of said second radio frequency signal by a selected one of a plurality of factors equal respectively to the quotient of said fixed factor and a corresponding one of said plurality of preselected factors for producing said input radio frequency signal.

4. In a system for precompensating for changes in the index of phase modulation of a radio frequency input signal applied to a transmitter as a result of frequency multiplication of the input signal by the transmitter by any one of a plurality of preselected factors, means for generating a first radio frequency signal with a predetermined index of phase modulation, means for reducing the index of phase modulation of said first radio frequency signal by a fixed factor for producing a second radio frequency signal, and switchable means for increasing the index of phase modulation of said second radio frequency signal by a selected one of a plurality of factors equal respectively to the quotient of said fixed factor and a corresponding one of said plurality of preselected factors for producing said input radio frequency signal.

5. In a system for precompensating for changes in the index of phase modulation of a radio frequency input signal applied to a transmitter as a result of frequency multiplication of the input signal by the transmitter by any of a plurality of preselected factors, means for generating a first radio frequency signal with a predetermined index of phase modulation, means for reducing the index of phase modulation of said first radio frequency signal by a fixed factor equal to the largest one of said selected plurality of factors for producing a second radio frequency signal, and switchable means for increasing the index of phase modulation of said second radio frequency signal by a selected one of a plurality of factors equal respectively to the quotient of said fixed factor and a corresponding one of said plurality of preselected factors for producing said input radio frequency signal.

6. In a system for applying a radio frequency input signal and an audio frequency input signal to a transmitter provided with switchable means for multiplying the frequency of the input radio frequency signal by any one of a plurality of preselected factors and with means for modulating the frequency-multiplied radio frequency signal with the audio frequency signal, the combination of means for producing a single sideband wave having amplitude- and phase-modulated components, said phase-modulated component having a predetermined index of phase modulation, means for deriving a first radio frequency signal from the phase-modulated component of said single sideband wave means for dividing the frequency of said first radio frequency signal by a fixed factor greater than one for producing a second radio frequency signal having an index of phase modulation reduced by said fixed factor, and switchable means for multiplying the frequency of said second radio frequency signal by a selected one of a plurality of factors equal respectively to the quotient of said fixed factor and the corresponding one of said plurality of preselected factors for producing said input radio frequency with an index of phase modulation equal respectively to the quotient of said fixed factor and the corresponding one of said plurality of preselected factors.

7. A method of precompensating for changes in the index of phase modulation of a signal as a result of frequency multiplication by any one of a plurality of preselected factors, comprising dividing the frequency of a signal by a first, fixed factor, and selectively multiplying the frequency of the resultant signal by a second, incrementally variable, integer factor equal to the quotient of the first factor and any one of said pre-selected factors.

8. A system for precompensating the modulation of a phase modulated signal to be fed to the input of a transmitter wherein the signal is multiplied in frequency by a selectable factor, comprising means for producing a radio frequency manifestation of the modulated signal with the frequency and modulation level thereof reduced by a fixed factor, and switchable means for increasing the frequency and modulation level of the frequency divided signal by a selected one of a plurality of factors to provide that the signal as further multiplied in said transmitter has a modulation level substantially equal to that of the initial signal.

9. A control apparatus for adjusting a phase modulated signal to be fed to the input of a transmitter having means for multiplying the frequency of the modulated signal by any one of a plurality of pre-selected factors, comprising fixed ratio means for dividing the frequency of the modulated signal by a selected factor to produce a second signal, and switchable means for multiplying the frequency of the second signal by a selected one of a plurality of factors equal to the quotient of said selected factor and a selected one of said plurality of pre-selected factors to produce said input signal.

10. In combination with a radio transmitter employing frequency multiplication, means for precompensating the level of modulation of a phase modulated radio frequency input signal prior to delivery of said signal to the transmitter, such precompensating means includin fixed ratio frequency divider means reducing the frequency and level of modulation of the said signal by an integer factor greater than the multiplication factor of said transmitter, and switchable means multiplying the frequency divided signal by an integer factor less than the division factor and such that the frequency multiplied, transmitted signal has a level of modulation substantially the same as the initial level of modulation of the initial signal.

11. In combination with a radio transmitter employing frequency multiplication of a phase modulated input signal by a factor $M_t$, means precompensating the level of modulation of the transmitted signal to be substantially the same as the level of modulation of the initial signal, such precompensating means including fixed ratio frequency divider means reducing the frequency and level of modulation of the input signal by a factor D, and means pre-multiplying the frequency divided signal by a factor M according to the relation $D$ equals $M$ times $M_t$ where D is such division factor, M is the pre-multiplication factor, and $M_t$ is the transmitter multiplication factor, and where D is greater than $M_t$.

References Cited in the file of this patent

UNITED STATES PATENTS

| | | |
|---|---|---|
| 1,861,462 | Trouant | June 7, 1932 |
| 2,666,133 | Kahn | Jan. 12, 1954 |
| 2,872,646 | Goldstine | Feb. 3, 1959 |